United States Patent [19]

Shuler

[11] Patent Number: 5,038,861
[45] Date of Patent: Aug. 13, 1991

[54] METHOD FOR PROLONGING THE USEFUL LIFE OF SCALE INHIBITORS INJECTED WITHIN A FORMATION

[75] Inventor: Patrick J. Shuler, Yorba Linda, Calif.

[73] Assignee: Chevron Research and Technology Company, San Francisco, Calif.

[21] Appl. No.: 528,636

[22] Filed: May 23, 1990

[51] Int. Cl.⁵ .............................................. E21B 43/12
[52] U.S. Cl. .................................. 166/279; 166/305.1; 252/8.552
[58] Field of Search ...................... 166/279, 300, 305.1, 166/310, 371; 252/8.552

[56] References Cited

U.S. PATENT DOCUMENTS

| 3,021,901 | 2/1962 | Earlougher | 166/279 |
|---|---|---|---|
| 3,467,192 | 9/1969 | Nolan, III et al. | 166/279 |
| 3,483,925 | 12/1969 | Slyker | 166/279 |
| 3,966,630 | 6/1976 | Quinlan | 252/8.552 X |
| 4,191,249 | 3/1980 | Sarem | 166/279 X |
| 4,462,718 | 7/1984 | McLaughlin et al. | 166/305.1 X |
| 4,485,874 | 12/1984 | Meyers | 166/279 |
| 4,741,400 | 5/1988 | Underdown | 166/279 |
| 4,779,679 | 10/1988 | Snavely, Jr. et al. | 166/279 |
| 4,860,829 | 8/1989 | Carlberg et al. | 166/279 |
| 4,947,934 | 8/1990 | Hen | 166/279 |

OTHER PUBLICATIONS

D. R. Underdown et al., "Evaluation of Calcium Carbonate Scale Inhibitors For Prudhoe Bay, Alaska" *Society of Petroleum Engineers*, SPE 15658, Oct. 1986.

Primary Examiner—George A. Suchfield
Attorney, Agent, or Firm—Edward J. Keeling; Ernest A. Schaal

[57] ABSTRACT

A method is disclosed for prolonging the useful life of scale inhibitors injected within a formation. This method involves injecting aqueous solution of polyquaternary amines into the formation. This solution of polyquaternary amines can be injected either prior to or simultaneously with the injection of the scale inhibitors. The scale inhibitors are preferably non-polymeric scale inhibitors. Preferably, the polyquaternary amine is a poly(dimethylamine-co-epichlorohydrin) or a poly(diallyldimethylammonium chloride).

8 Claims, 3 Drawing Sheets

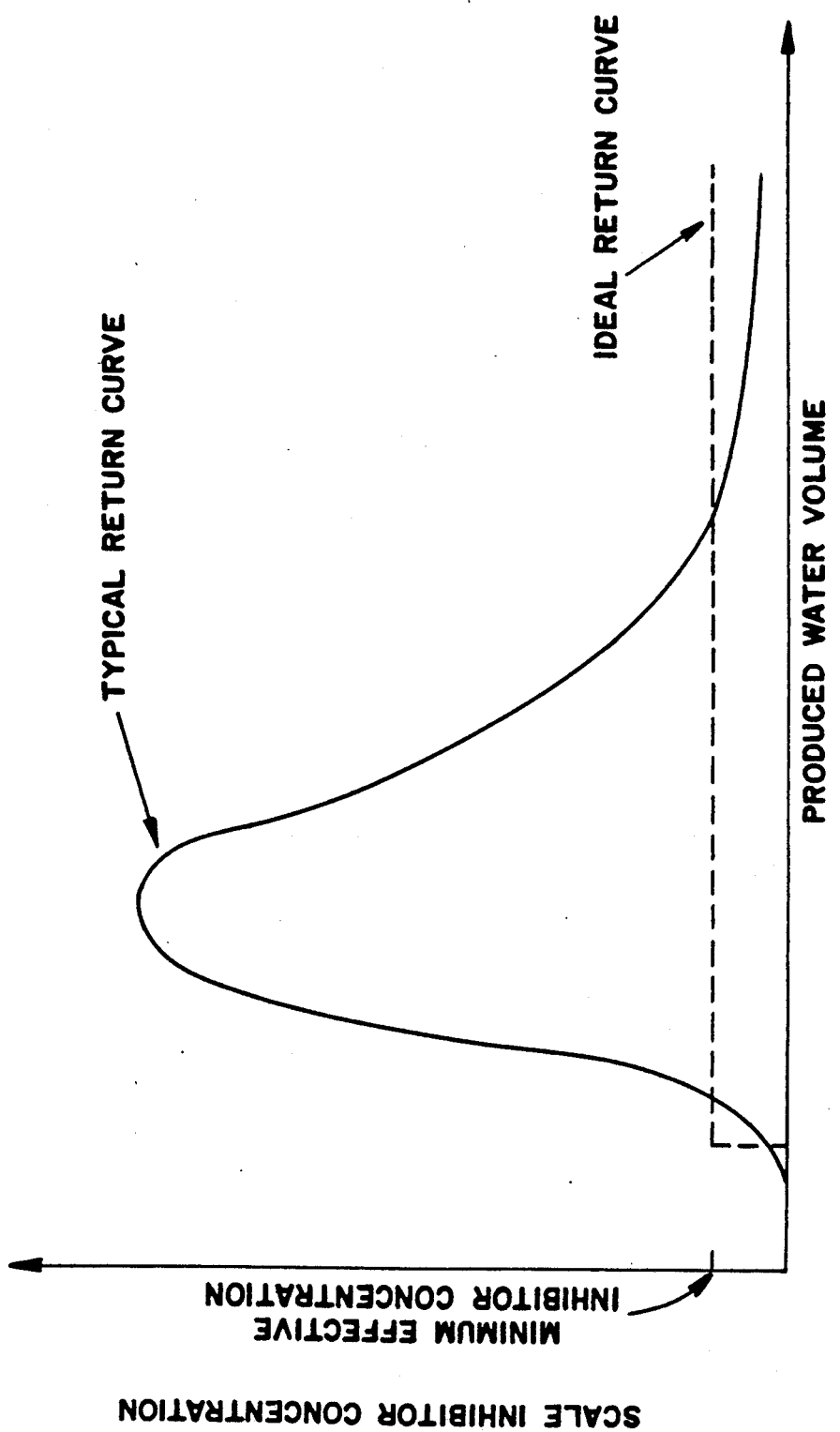

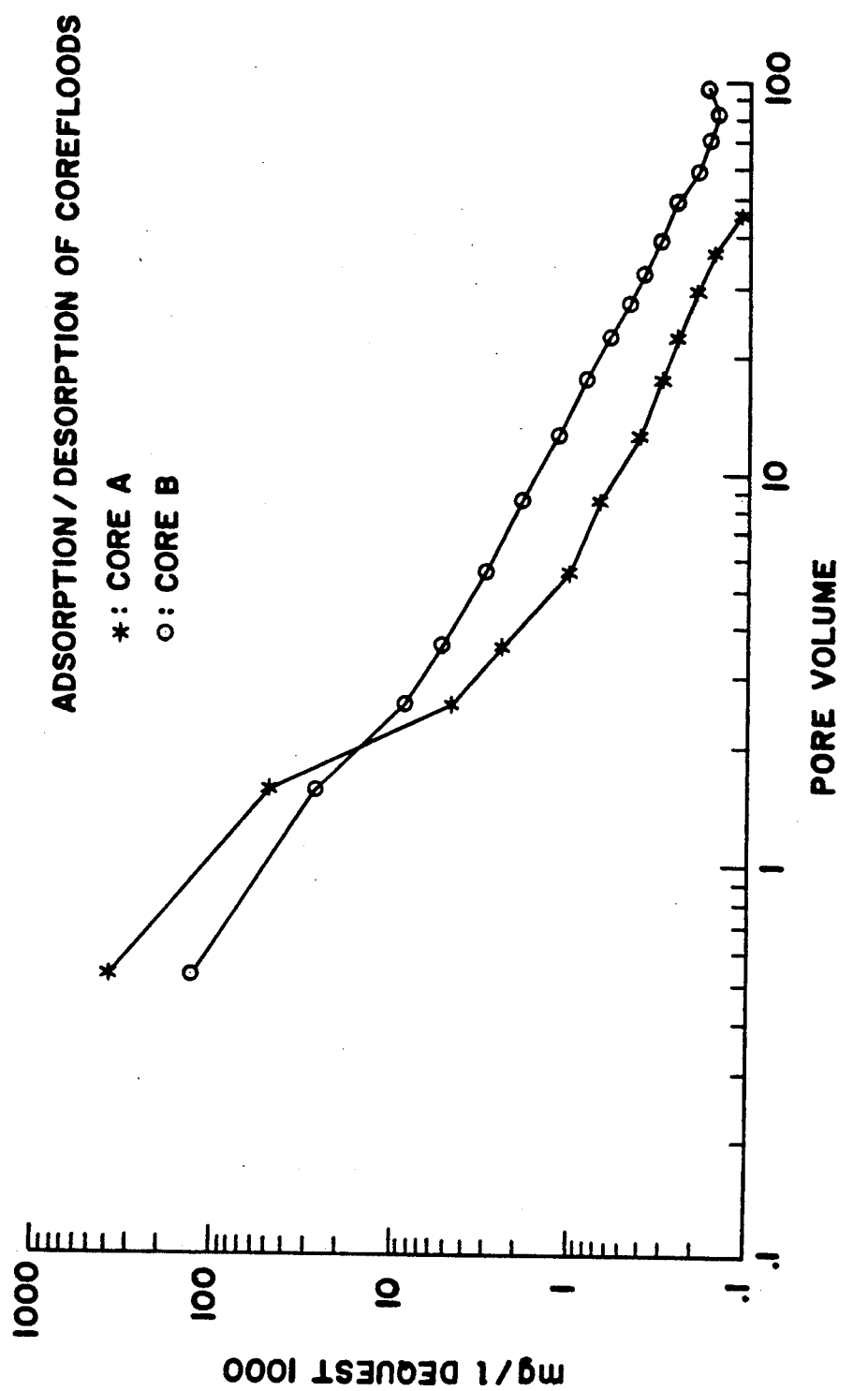
FIG_2

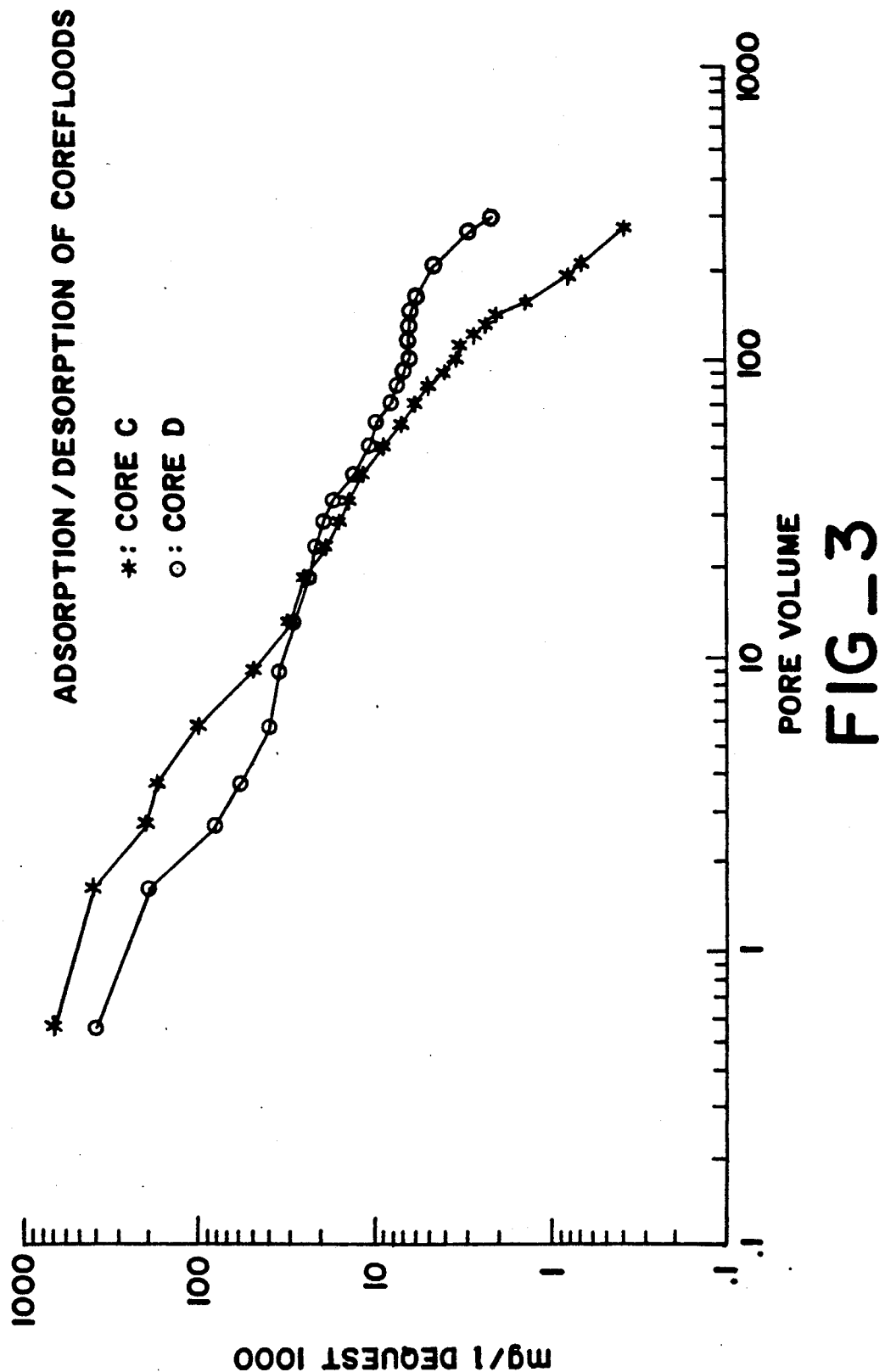

METHOD FOR PROLONGING THE USEFUL LIFE OF SCALE INHIBITORS INJECTED WITHIN A FORMATION

The present invention relates to the scale inhibitor squeeze process applied in production wells.

BACKGROUND OF THE INVENTION

Scale inhibitors are applied in production wells to prevent precipitation of water-borne deposits, such as barium sulfate, calcium carbonate, and calcium sulfate. Such precipitates can hinder fluid production by blocking the flow paths either inside the formation or at the perforations. Scale deposition also can appear in the tubing, slowing fluid production and damaging downhole equipment.

One common method of applying a scale inhibitor is the "squeeze process." The steps involved in the squeeze process include:
1. injecting the aqueous scale inhibitor solution (often a low percent inhibitor concentration),
2. injecting an overflush brine solution to push the scale inhibitor several feet away from the wellbore,
3. shutting-in the well for about a day to allow maximum retention of the inhibitor on the rock surfaces, and
4. putting the well back on normal production.

The produced water then slowly leaches the retained scale inhibitor from the formation. Ideally this places a low, but still effective, concentration (typically a low mg/l) of the scale inhibitor into the produced water to prevent scale deposition for many weeks or even months.

FIG. 1 illustrates the usual return scale inhibitor concentrations from a squeeze treatment. The response from such a treatment often shows:
1. a short period of no inhibitor while the overflush is produced back;
2. a rapid increase of inhibitor concentration for a short time, representing material not retained well in the formation; and
3. a gradual decline of inhibitor concentration.

This continues until the inhibitor concentration finally falls to the minimum effective concentration. The "squeeze lifetime" is the length of time to this point. Then the squeeze must be repeated.

The squeeze process is chemically inefficient. The inhibitor concentration is higher than necessary, particularly in the early stages, and a significant amount of the inhibitor often remains adsorbed inside the formation after the squeeze. Usually two-thirds of the injected scale inhibitor is wasted.

FIG. 1 also shows an ideal scale inhibitor return curve. Once the overflush is brought back, the inhibitor desorbs into the produced water such that the chemical concentration is just above the minimum effective level. This continues until all squeezed inhibitor is released from the formation. Such an ideal process would have a chemical efficiency of almost 100%, or equivalently, a longer squeeze life with the same amount of scale inhibitor.

SUMMARY OF THE INVENTION

The present invention is a method for prolonging useful life of scale inhibitors injected within a formation. This method involves injecting an aqueous solution of polyquaternary amines into the formation. That solution of polyquaternary amines can be injected either before or with the injection of the scale inhibitors.

Preferably, the scale inhibitors are non-polymeric scale inhibitors, such as amine phosphonates. Useful amine phosphonates include aminotri (methylene phosphonic acid) and diethyltriaminepenta (methylene phosphonic acid).

Preferably, the polyquaternary amine is either a poly(dimethylamine-coepichlorohydrin) or a poly(diallyldimethylammonium chloride).

The present invention also involves a method for inhibiting scale buildup within a formation surrounding a production well. That method comprises stopping the production well, injecting an aqueous solution of polyquaternary amines, injecting an aqueous solution of scale inhibitor, injecting a water flush, shutting in the production well, and starting the production well.

Also novel is the aqueous solution comprising polyquaternary amines and scale inhibitors used in the above methods.

BRIEF DESCRIPTION OF THE DRAWINGS

In order to facilitate the understanding of this invention, reference will now be made to the appended drawings of the preferred embodiments of the present invention. The drawings are exemplary only, and should not be construed as limiting the invention.

FIG. 1 is an ideal scale inhibitor return curve.

FIGS. 2 and 3 are graphs of results for four different coreflood experiments.

DETAILED DESCRIPTION OF THE PREFERRED EMBODIMENTS

In its broadest aspect, the present invention is a method for prolonging useful life of scale inhibitors injected within a formation. This method involves injecting polyquaternary amines into the formation.

Laboratory experiments show that including a polyquaternary amine solution in the scale inhibitor squeeze process improves the retention/release characteristics of a scale inhibitor. The squeeze behaves more like the ideal case, showing a longer squeeze lifetime with the same amount of scale inhibitor.

The specific process tested in the laboratory used a preflush of a polyquaternary amine solution, followed by a brine flush. This flush removed the bulk of the amine chemical from the pore spaces, leaving just the polymer adsorbed on the rock surfaces. This flush was followed with the normal scale inhibitor squeeze process described above. As detailed below, this new procedure approximately doubled the squeeze lifetime.

THE INJECTION METHOD

The solution of polyquaternary amines can be injected either before or during the injection of the scale inhibitors. Injecting the polyquaternary amine before the scale inhibitor solution may improve squeeze life more than if injected simultaneously with a scale inhibitor. On the other hand, injecting the polyquaternary amine simultaneously with a scale inhibitor requires one less mixing tank and is less complicated to administer.

THE SCALE INHIBITORS

By "scale inhibitors," we mean chemical additives that will prevent the formation of water-borne deposits even at low concentrations of additives. Types of scale inhibitors that would work in the present invention include, but are not limited to, phosphate esters, phosphonates, and possibly polymeric products such as polyacrylates, polyacrlyamides, and polymaleic acids. Squeeze treatments commonly use phosphonate chemistry.

Preferably, the scale inhibitors are non-polymeric scale inhibitors. More preferably, they are amino phosphonates, such as aminotri (methylene phosphonic acid) or diethyltriaminepenta (methylene phosphonic acid). The chemical formula for aminotri (methylene phosphonic acid) is:

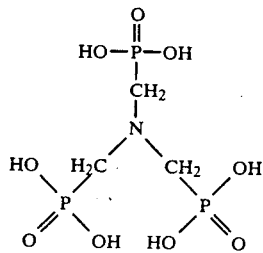

The selection of phosphonate scale inhibitor can be based upon the chemistry of the water borne deposit. For example, a diethyltriamine (methylene phosphonic acid) inhibitor probably would be preferred to prevent barium sulfate deposition.

THE POLYQUATERNARY AMINES

By "polyquaternary amine," we mean a polymer containing the following repeat group:

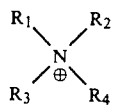

$R_1$, $R_2$, $R_3$, and $R_4$ can be any aliphatic or aromatic group.

Types of polyquaternary amines that would work in the present invention include, but are not limited to, poly(dimethylamine-co-epichlorohydrin) or poly(diallyldimethylammonium chloride). Depending upon the brine and formation chemistry, one polyquaternary amine may be more effective than another in extending squeeze lifetime. A preferred embodiment is to use polyquaternary amines with molecular weights below 50,000. Higher molecular weight materials may be difficult to inject.

A METHOD FOR INHIBITING SCALE BUILDUP

In one embodiment, scale buildup within a formation surrounding a production well is inhibited by the steps of stopping the production well; injecting into the production well an aqueous solution of polyquaternary amines, an aqueous solution of scale inhibitor, and a water flush; shutting in the production well; and starting the production well.

By "stopping a production well," we mean halting normal production. After production is stopped, any necessary mechanical modifications are performed to allow subsequent fluid injection.

By "water flush," we mean an aqueous brine solution that is injected into a well undergoing a squeeze treatment.

By "shutting in a production well," we mean halting fluid injection and allowing the injected chemicals time to adsorb to the formation rock.

By "starting a production well," we mean resuming the normal production of fluids.

EXAMPLES

The core used was a 1" dia. × 12" long unfired Berea sandstone. A fresh core was used for each experiment, having approximately 30 ml. pore volume (PV). The temperature and pressure were ambient conditions. The brine was 0.75% NaCl and 184 mg/l $CaCl_2 \cdot 2H_2O$ (50 mg/l Ca)

The squeeze comprised of steps:
1. Clean the core with acetone, toluene, and brine.
2. Inject polyquaternary amine solution (if included in that test), followed by a flush. The polyquaternary amine solution was Haliburton's CLASTA II, 2% in a 2% $NH_4Cl$ brine, 2 PV at 0.5 ml/min. The flush was with 2 PV of Brine, 0.5 l/min.
3. Inject scale inhibitor solution. The scale inhibitor solution was Monsanto's Dequest 2000, 2% in Brine (0.25 PV at 0.50 ml./min.)
4. Inject overflush (Brine of 0.5 PV at 0.5 ml./min.).
5. Shut-in core for 20-24 hours.
6. Reverse core.
7. Start injection of Brine at 1.0 ml./min. from other end to mimic a well returning to production following inhibitor squeeze.
8. Collect effluent samples and measure the scale inhibitor concentration. Plot the chemical concentration versus the pore volumes of produced brine.

The chemical formula for a useful polyquaternary amine is a poly (dimethylamine-co-epichlorohydrin):

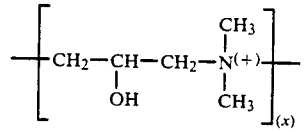

It is sold as a clay stabilizer, used to prevent clay swelling and migration and subsequent formation damage. Table 1 and FIGS. 2 and 3 summarize the results for four different coreflood experiments using this polyquaternary amine.

TABLE I

| Core | Polyquaternary Amine Prefulsh Included? | Injected Scale Inhibitor Solution pH | Squeeze Lifetime-Cummulative PV of Water Produced to Reach 3 mg/l Inhibitor Concentration |
|---|---|---|---|
| A | No | 7 | 20 |
| B | Yes | 7 | 43 |
| C | No | 2 | 105 |
| D | Yes | 2 | 245 |

These results show using a polyquaternary amine preflush treatment improves the retention/release characteristics of the scale inhibitor. The polyquaternary amine returns are closer to the ideal behavior depicted in FIG. 1. The inhibitor appears initially at a lower concentration and persists in the low mg/l useful range for more pore volumes of production. Using 3 mg/l as a cut-off, the preflush treatment approximately doubles the squeeze lifetime.

While the present invention has been described with reference to specific embodiments, this application is intended to cover those various changes and substitutions which may be made by those skilled in the art without departing from the spirit and scope of the appended claims.

What is claimed is:

1. A method for prolonging useful life of scale inhibitors injected within a formation comprising:
   (a) injecting an aqueous solution of said scale inhibitors into said formation: and
   (b) injecting an aqueous solution of polyquaternary amines into said formation.

2. A method according to claim 1 wherein said solution of polyquaternary amines is injected prior to the injection of said scale inhibitors.

3. A method according to claim 1 wherein said scale inhibitors are non-polymeric scale inhibitors.

4. A method according to claim 3 wherein said non-polymeric scale inhibitors are amine phosphonates.

5. A method according to claim 4 wherein said amine phosphonate is aminotri (methylene phosphonic acid).

6. A method according to claim 4 wherein said amine phosphonate is diethyltriaminepenta (methylene phosphonic acid).

7. A method according to claim 1 wherein said polyquaternary amine is a poly(dimethylamine-co-epichlorohydrin).

8. A method according to claim 1 wherein said polyquaternary amine is a poly(diallyldimethylammonium chloride).

* * * * *